(12) United States Patent
Bayon et al.

(10) Patent No.: US 11,921,877 B2
(45) Date of Patent: Mar. 5, 2024

(54) EFFICIENT RANDOM TOKENIZATION IN THE CLOUD

(71) Applicant: AMADEUS S.A.S., Biot (FR)

(72) Inventors: Roman Bayon, Antibes (FR); Sylvain Palmier, Antibes (FR); Rodrigo Broggi, Antibes (FR); Michele Minelli, Zaventem (BE)

(73) Assignee: Amadeus S.A.S., Biot (FR)

( * ) Notice: Subject to any disclaimer, the term of this patent is extended or adjusted under 35 U.S.C. 154(b) by 207 days.

(21) Appl. No.: 17/098,846

(22) Filed: Nov. 16, 2020

(65) Prior Publication Data
US 2021/0256150 A1    Aug. 19, 2021

(30) Foreign Application Priority Data
Feb. 14, 2020 (FR) ...................................... 2001463

(51) Int. Cl.
G06F 21/60 (2013.01)
G06F 21/33 (2013.01)
G06F 21/62 (2013.01)

(52) U.S. Cl.
CPC ........ *G06F 21/6227* (2013.01); *G06F 21/335* (2013.01); *G06F 21/602* (2013.01); *G06F 21/6254* (2013.01)

(58) Field of Classification Search
CPC .. G06F 21/6227; G06F 21/335; G06F 21/602; G06F 21/6254; G06F 21/6245; H04W 12/02; H04L 63/0435; H04L 9/14
USPC .............. 713/164, 165, 191, 193; 726/9, 20
See application file for complete search history.

(56) References Cited

U.S. PATENT DOCUMENTS

| | | | |
|---|---|---|---|
| 2005/0226420 A1 | 10/2005 | Makela et al. | |
| 2012/0278504 A1* | 11/2012 | Ang | G06F 21/10 709/246 |
| 2019/0068558 A1 | 2/2019 | Jindal | |
| 2019/0342088 A1 | 11/2019 | Eidson et al. | |

OTHER PUBLICATIONS

National Institute of Industrial Property, Preliminary Search Report issued in French Patent Application No. 2001463 dated Oct. 22, 2020.
A. Ukil, "Privacy Preserving Data Aggregation in Wireless Sensor Networks," 2010 6th International Conference on Wireless and Mobile Communications, Valencia, 2010, pp. 435-440.
European Patent Office; Extended European Search Report and Written Opinion issued in European Patent Application No. 20208945.4 dated Jan. 18, 2021; 6 pages.

* cited by examiner

Primary Examiner — Izunna Okeke
(74) Attorney, Agent, or Firm — Thompson Hine LLP

(57) ABSTRACT

Systems and methods for providing decentralized tokenization with mapping data devoid of sensitive data. A node receives a set of index-key pairs generated by a randomization service external to the node. Each index-key pair in the set of index-key pairs defines a particular index value mapped to a particular random key value. The node creates a mapping structure using the set of index-key pairs. Data-in-transit comprising sensitive data is received. A tokenization service of the node generates a token for the sensitive data using the mapping structure.

18 Claims, 5 Drawing Sheets

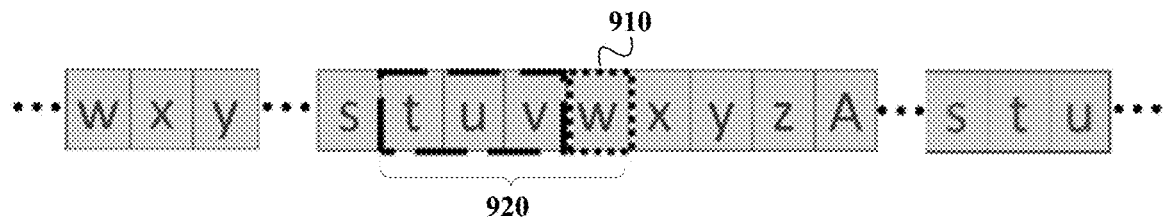
FIG. 9
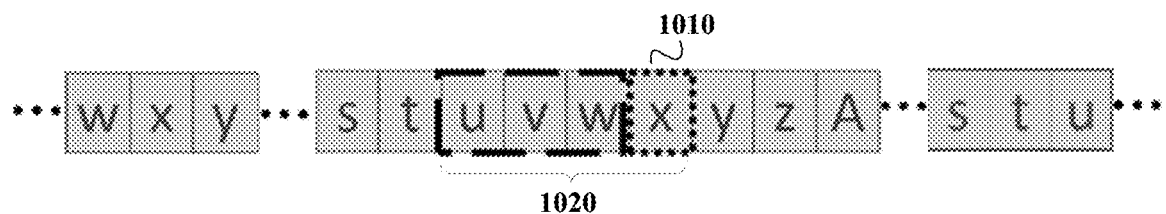
FIG. 10
$$1100 \int SD = \underbrace{444433}_{1102} - \underbrace{332222}_{1104} - \underbrace{1111}_{1106}$$
$$1150 \int TK = \underbrace{444433}_{1102} - \underbrace{a4Z5be}_{1154} - \underbrace{1111}_{1106}$$
FIG. 11
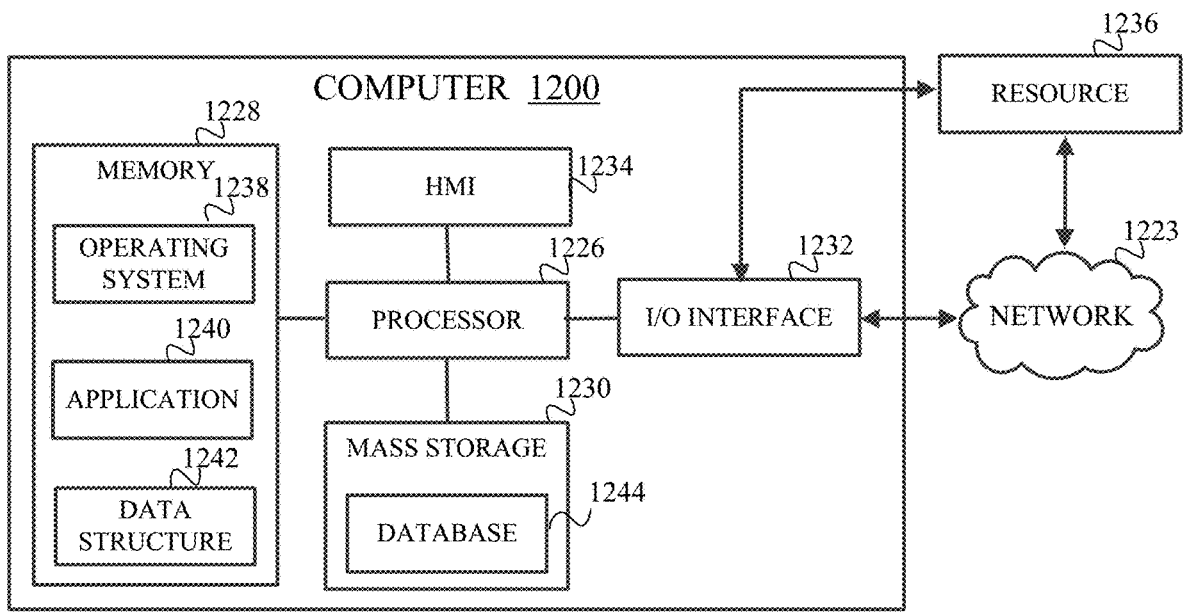
FIG. 12

EFFICIENT RANDOM TOKENIZATION IN THE CLOUD

TECHNICAL FIELD

The present invention relates generally to tokenization processes, although not limited thereto. More specifically, the present invention relates to techniques for providing decentralized tokenization with mapping data devoid of sensitive data.

BACKGROUND

Some electronic data stored on computing devices or exchanged between computing devices over communication channels coupling such devices includes sensitive data. Examples of such sensitive data includes: credential information (e.g., password, user name, etc.), electronic Personal Health Information, Primary Account Numbers, social security numbers, credit card numbers, and the like. In some instances, an unauthorized person may obtain such sensitive data for nefarious purposes. Consequently, various techniques are used to mitigate exposure of such sensitive data to unauthorized persons.

One such technique used to mitigate exposure of sensitive data to unauthorized persons is known as data tokenization. Data tokenization or tokenization generally refers to a process of replacing sensitive data with non-sensitive data. As explained by the Payment Card Industry ("PCI") Security Standards Council "[t]he security objective of a tokenization process is to ensure the resulting token has no value to an attacker." To that end, a tokenization process is configured to generate "tokens" (i.e., tokenized versions of sensitive data) that lack any extrinsic meaning or value. Since tokens lack any extrinsic meaning or value, mapping data is generally retained that associates each token with a particular instance of sensitive data it replaces. Such mapping data may facilitate deriving replaced sensitive data from a corresponding token.

Thus, improved techniques of tokenizing sensitive data and enhancing security of mapping data are needed to meet the security objective of a tokenization process.

SUMMARY

Embodiments of the present invention provide systems, methods, and computer-readable storage media for providing decentralized tokenization with mapping data devoid of sensitive data. In an embodiment, a system includes a node comprising a processor, a computer-readable storage medium, and a tokenization service. The computer-readable storage medium includes instructions that upon execution by the processor cause the system to perform operations. The operations include receiving, by the node, a set of index-key pairs generated by a randomization service external to the node. Each index-key pair in the set of index-key pairs defines a particular index value mapped to a particular random. The node creates a mapping structure using the set of index-key pairs. For example, the node parses the set of index-key pairs to create the mapping structure. Data-in-transit comprising sensitive data is received. The tokenization service generates a token for the sensitive data using the mapping structure.

In another embodiment, a method includes receiving, by a node, a set of index-key pairs generated by a randomization service external to the node. Each index-key pair in the set of index-key pairs defines a particular index value mapped to a particular random. The node creates a mapping structure using the set of index-key pairs. Data-in-transit comprising sensitive data is received. A tokenization service of the node generates a token for the sensitive data using the mapping structure.

In another embodiment, a non-transitory computer-readable storage medium including computer-readable instructions is provided. Upon execution by a processor of a computing device, the computer-readable instructions cause the computing device to receive, by a node, a set of index-key pairs generated by a randomization service external to the node. Each index-key pair in the set of index-key pairs defines a particular index value mapped to a particular random. The node creates a mapping structure using the set of index-key pairs. Data-in-transit comprising sensitive data is received. A tokenization service of the node generates a token for the sensitive data using the mapping structure.

In embodiments, the mapping structure includes a plurality of index values and generating the token for the sensitive data comprises randomly selecting an index value from among the plurality of index values. In embodiments, generating the token for the sensitive data further comprises performing an invertible operation on the sensitive data and a random value mapped to the index value in the mapping structure to generate a portion of the token. In embodiments, generating the token for the sensitive data further comprises concatenating the index value to the portion of the token. In embodiments, generating the token for the sensitive data further comprises concatenating a version identifier associated with the mapping structure to the portion of the token.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 9 illustrates an example of mapping structure versioning at a first time.

FIG. 10 illustrates the example of mapping structure versioning at a second time that is subsequent to the first time illustrated in FIG. 9.

FIG. 11 illustrates an example of sensitive data and an associated token having an equivalent number of bytes while having a dissimilar number of bits.

FIG. 12 is a block diagram of an example computing environment suitable for use in implementing embodiments of the invention.

DETAILED DESCRIPTION

Figure 1:
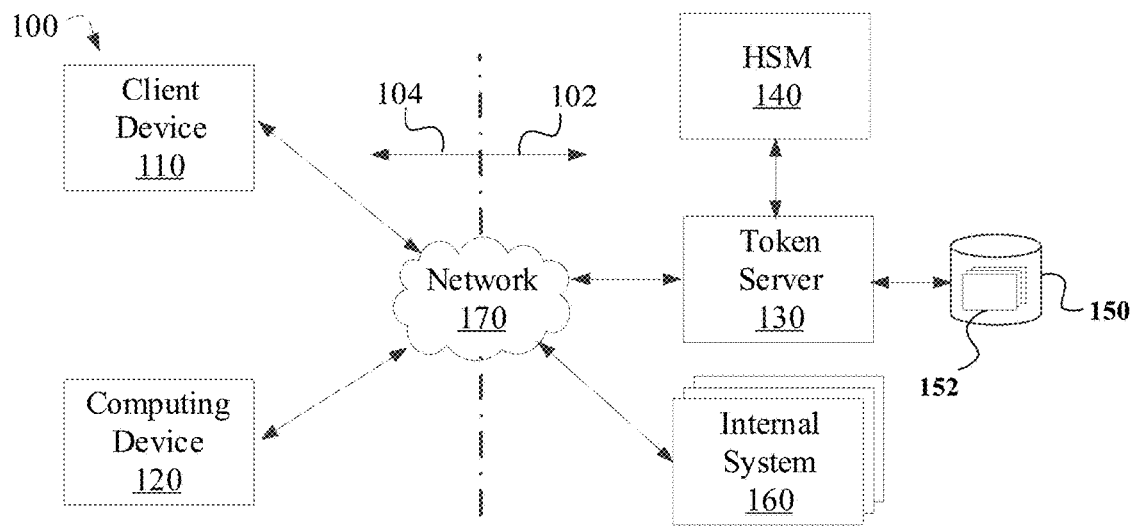
FIG. 1 is a block diagram of an example operating environment that is suitable for implementing aspects of the present invention.

Techniques described herein relate to tokenizing sensitive data and enhancing security of token mapping data. Referring to FIG. 1, an example operating environment for implementing aspects of the present invention is illustrated and designated generally 100. Operating environment 100 includes client device 110, computing device 120, token server 130, hardware security module ("HSM") 140, database or token vault 150, and internal system 160. FIG. 1 depicts the various computing devices as communicating with each other via networks (e.g., network 170), which may include one or more public and/or private networks. Examples of networks that are suitable for implementing network 170 include: local area networks (LANs), wide area networks (WANs), cellular networks, the Internet, and the like.

Within operating environment 100 is a trusted environment 102 and an untrusted environment 104. Trusted environment 102 represents a portion of operating environment 100 that is, at least, partially partitioned from other portions of operating environment 100, such as untrusted environment 104. By way of example, trusted environment 102 may be partitioned or segmented from other portions of operating environment 100 using physical barriers (e.g., fences), logical barriers (e.g., firewalls), and the like. Through such partitioning, trusted environment 102 and untrusted environment 104 may implement different security measures providing different levels of protection for data stored and/or communicated within each respective environment. As a result, a likelihood that an unauthorized person is able to compromise data stored and/or communicated within each respective environment of operating environment 100 may be different.

For example, trusted environment 102 may implement security measures that provide a greater level of protection for data stored and/or communicated within trusted environment 102 than is provided by security measures implemented by untrusted environment 104 for data stored and/or communicated within untrusted environment 104. In this example, an unauthorized person would be more likely to compromise data stored and/or communicated within untrusted environment 104 than they would data stored and/or communicated within trusted environment 102. By extension, if such data included sensitive data, an unauthorized person would likewise be more likely to compromise sensitive data stored and/or communicated within untrusted environment 104 than they would sensitive data stored and/or communicated within trusted environment 102.

As used herein, "sensitive data" refers to any information concerning an entity that may subject the entity to heightened risk or loss of an advantage if compromised, lost, or inadvertently disclosed through unauthorized access. Examples of sensitive data include: credential information (e.g., password, user name, etc.); personally identifiable information ("PII") (e.g., social security numbers, passport numbers, etc.); electronic Personal Health Information ("PHI"); financial data (e.g., credit card numbers, bank account numbers, etc.).

In operating environment 100, tokenization is implemented to minimize the exposure of sensitive data to unauthorized persons in untrusted environment 104, as described in greater detail below. To that end, computing devices within untrusted environment 104, such as client device 110 and computing device 120, submit tokenization requests including sensitive data to token server 130. In response to such tokenization requests, token server 130 returns tokens. Generally, a "token" refers to non-sensitive data lacking any extrinsic meaning or value that serves as a proxy for associated sensitive data. Examples of suitable values for implementing tokens include: numeric values, alphabetic values, alphanumeric values, and the like.

By way of example, client device 110 may need to exchange credit card information with computing device 120 during a transaction. To minimize exposure of the credit card information to unauthorized persons in untrusted environment 104, client device 110 may submit a tokenization request to token server 130. The tokenization request submitted by client device 110 may include the credit card information. In response to the tokenization request, client device 110 may receive a tokenization response from token server 130 comprising a token mapped to the credit card information. The token that client device 110 receives serves as a proxy for the credit card information. Instead of transmitting the credit card information to computing device 120, client device 110 transmits the token as a proxy for the credit card information.

In operating environment 100, a computing device may transmit a detokenization request including a token to token server 130 to retrieve sensitive data associated with the token. In response to the detokenization request, the computing device 120 may receive a detokenization response from token server 130. The detokenization response that computing device 120 receives comprises a particular instance of sensitive data associated with the token by mapping data 152 stored in database 150 that uniquely associates each token with a particular of sensitive data. In an embodiment, database 150 provides exclusive storage for mapping data in operating environment 100.

Continuing with the example above, computing device 120 may transmit a detokenization request to token server 130 that includes the token received from client device 110. In response to the detokenization request, token server 130 may transmit a detokenization response to computing device 120 that includes the credit card information that was included in the tokenization request submitted by client device 110.

In some embodiments, token server 130 may interact with HSM 140 to perform cryptographic operations on various data exchanged or stored within operating environment 100. For example, token server 130 may transmit an encryption request including data (e.g., sensitive data) to HSM 140. In response, HSM 140 may perform a cryptographic operation on the data included in the encryption request to generate encrypted data. Token server 130 may then receive an encryption response including the encrypted data from HSM 140.

One skilled in the art may recognize that an HSM describes specialized circuitry (e.g., a cryptoprocessor) that is optimized to perform hardware-based cryptographic operations. Such cryptographic operations include encryption operations and decryption operations. An encryption operation involves applying source data and a key to an input of an encryption algorithm to produce encrypted data on an output of the encryption algorithm. A decryption operation involves applying encrypted data and a key to an input of a decryption algorithm to produce the source data. Examples of algorithms suitable for implementing the encryption algorithm and/or the decryption algorithm include: Advanced Encryption Standard (AES) algorithms; Data Encryption Standard (DES) algorithms; Digital Signature Algorithm (DSA) algorithms; Rivest-Shamir-Adleman (RSA) algorithms; and the like.

Figure 2A:
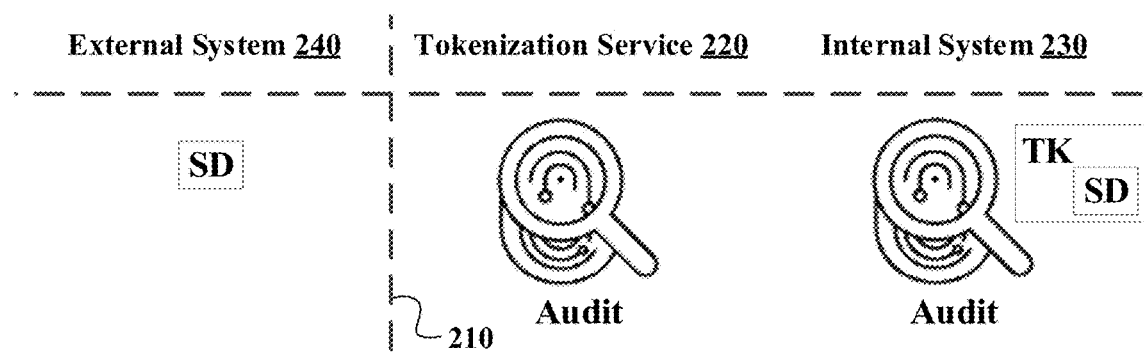
FIGS. 2A and 2B illustrate a high-level overview of segmenting elements within a trusted environment, in accordance with an embodiment of the present invention.
Figure 2B:

As noted above, trusted environment 102 may implement security measures that facilitate data security within trusted environment 102. In an embodiment, one such security measure comprises segmenting elements of trusted environment 102 from other elements of trusted environment 102. FIGS. 2A and 2B illustrate a high-level, conceptual overview of such segmentation. In FIGS. 2A and 2B, partition 210 segments elements of a trusted environment comprising tokenization service 220 and internal system 230 from elements of an untrusted environment comprising external system 240. As such, partition 210 may represent one or more physical partitions and/or logical partitions that segment trusted environment 102 from untrusted environment 104 in operating environment 100. The segmentation provided partition 210 improves security of data within the trusted environment by limiting access to that data by elements of the untrusted environment, such as external system 240.

Additional data security within the trusted environment may be achieved by implementing a security measure that limits access to sensitive data by elements of the trusted environment. To that end, partition 250 may be implemented to segment tokenization service 220 from internal system 230, as illustrated by FIG. 2B. Partition 250 provides additional data security within the trusted environment by isolating elements involved in generating tokens (e.g., tokenization service 220) from other elements of the trusted environment that may utilize tokens (e.g., internal system 230). Such isolation may also reduce a number of elements within the trusted environment that are subject to audit when the sensitive data is subject to regulatory compliance.

For example, partition 250 was not implemented in FIG. 2A to segment tokenization service 220 from internal system 230. Absent the isolation provided by partition 250, internal system 230 may be subject to audit in FIG. 2A due to the presence of sensitive data within tokens processed by internal system 230. In contrast, partition 250 was implemented in FIG. 2B to segment tokenization service 220 from internal system 230. Notwithstanding the presence of sensitive data within tokens processed by internal system 230, partition 250 provides isolation in FIG. 2B that may exclude internal system 230 from being subject to regulatory compliance. As such, internal system 230 may not be subject to audit in FIG. 2B.

Continuing with the example discussed above with respect to FIG. 1, trusted environment 102 may represent an e-commerce platform. In this instance, client device 110 may submit the credit card information as part of a transaction conducted with the e-commerce platform. One skilled in the art may recognize that the PCI Security Standards Council establishes regulatory guidelines (e.g., the PCI Data Security Standard ("PCI-DSS")) that govern many such transactions involving credit card information. If the PCI-DSS governs transactions involving the credit card information submitted by client device 110, each element of trusted environment 102 may be subject to audit under the compliance framework it defines.

Under the PCI-DSS, all systems that store, process, or transmit cardholder data (e.g., the credit card information) are considered within the scope of PCI-DSS compliance. Tokenizing the credit card information submitted by client device 110 would likely be construed as processing cardholder data. Therefore, token server 130 would likely be considered within the scope of PCI-DSS compliance, and thus subject to audit. Database 150 would likewise be considered within the scope of PCI-DSS compliance and subject to audit if the credit card information is included in mapping data 152.

In some instances, encrypting cardholder data is sufficient to render the cardholder data out of scope for PCI-DSS compliance. As such, internal system 160 may be considered out of scope for PCI-DSS compliance if token server 130 submits the credit card information to HSM 140 to encrypt as part of the tokenization process prior to forwarding the resulting token to internal system 160 for further processing of the transaction. However, the PCI-DSS considers encrypted cardholder data within the scope of PCI-DSS compliance when it is present in the same environment as the decryption key. As such, the PCI-DSS would likely require the e-commerce platform (represented by trusted environment 102) to implement a partition between HSM 140 and internal systems 160 similar to partition 250 of FIG. 2B for internal system 160 remain out of scope for PCI-DSS compliance. Absent such isolation internal system 160 would likely be considered within the scope of PCI-DSS compliance by processing the token comprising the encrypted credit card information, and thus subject to audit.

Each of the systems shown in FIG. 1 may be implemented via any type of computing system, such as computing system 1200 (also referred to as computer system 1200) described in greater detail below with respect to FIG. 12. Each system shown in FIG. 1 may comprise a single device or multiple devices cooperating in a distributed environment. For instance, token server 130, HSM 140, database 150, and/or internal system 160 may be provided via multiple devices arranged in a distributed environment that collectively provide the functionality described herein. Additionally, other components not shown may also be included within the distributed environment.

Figure 3:
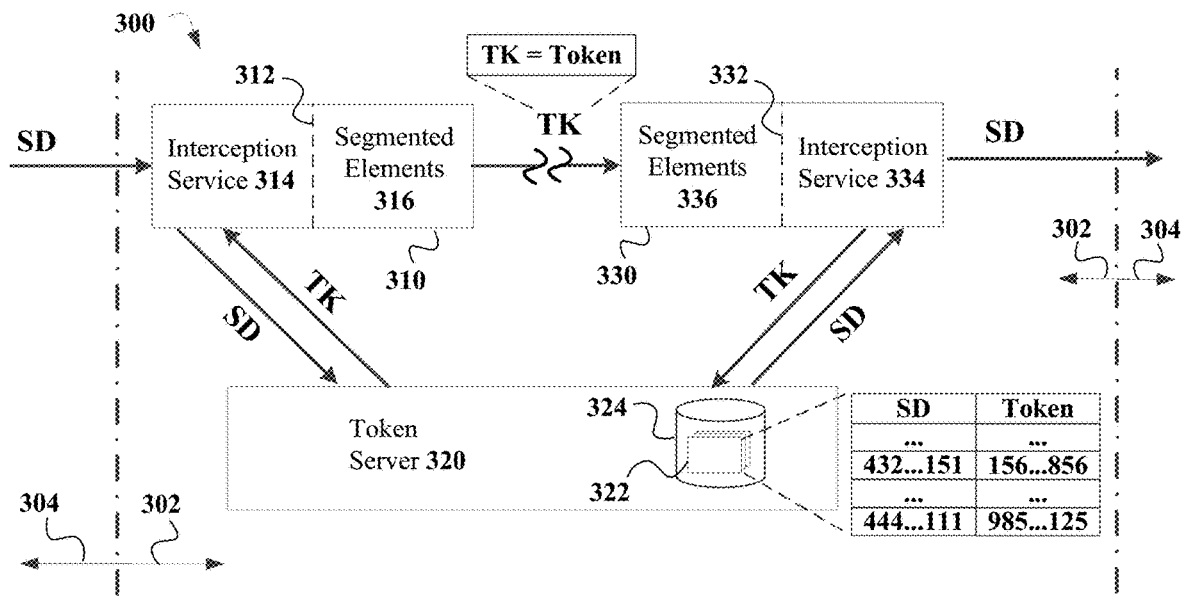
FIG. 3 is a block diagram of an example system for segmenting elements within a trusted environment using centralized tokenization services.

FIG. 3 is a block diagram of an example system 300 for segmenting elements within a trusted environment 302 using centralized tokenization. In FIG. 3, nodes 310 and 330 generally represent endpoints of trusted environment 302. Sensitive data is received from elements of an untrusted environment 304 via node 310 and is returned to elements of the untrusted environment 304 via node 330. To facilitate a reduction in the number of elements within trusted environment 302 that have access to sensitive data, node 310 implements partition 312 and node 330 implements partition 332. In an embodiment, trusted environment 302 and untrusted environment 304 are implemented with trusted environment 102 and untrusted environment 104 of FIG. 1, respectively.

Node 310 comprises a data flow processing unit for processing data received from elements of untrusted environment 304 that intervenes between partition 312 and untrusted environment 304. In FIG. 3, that data flow processing unit comprises an interception service 314. Interception service 314 is configured to submit tokenization requests comprising the sensitive data received from elements of untrusted environment 304 to token server 320. In response to each tokenization request, interception service 314 receives a tokenization response comprising a token generated by token server 320 for sensitive data included in that tokenization request. Tokens generated by token server 320 are communicated from interception service 314 to other elements (e.g. segmented elements 316 and/or 336) of trusted environment 302 via partition 312 for further processing.

Node 330 comprises a data flow processing unit for processing data received from elements of untrusted environment 304 that intervenes between partition 332 and untrusted environment 304. In FIG. 3, that data flow processing unit comprises an interception service 334. Interception service 334 is configured to submit detokenization requests to token server 320 comprising tokens received from other elements (e.g., segmented elements 316 and/or 336) of trusted environment 302 via partition 332. In response to each detokenization request, interception service 334 receives a detokenization response from token server 320 comprising a particular instance of sensitive data mapped to a given token included that detokenization request. Interception service 314 communicates each instance of sensitive data received from token server 320 to untrusted environment 304 based on address information that interception service 314 receives with a corresponding token.

In processing tokenization and detokenization requests received from endpoints of trusted environment 302, token server 320 provides trusted environment 302 with centralized tokenization. One aspect of centralizing tokenization in trusted environment 302 is that any mapping data involved in processing tokenization and detokenization requests may be localized at token server 320. As a result, trusted environment 302 may limit such mapping data to the mapping data 322 stored in database 324. In doing so, trusted environment 302 may reduce or eliminate data replication operations that some decentralized tokenization implementations effectuate to ensure that consistent mapping data is available at each location where tokenization and detokenization operations occur.

Another aspect of centralizing tokenization is that each tokenization or detokenization operation involves a roundtrip communication between a node of trusted environment 302 and token server 320. As a result, any sensitive data-related communications between trusted environment 302 and untrusted environment 304 incur processing delays arising from such roundtrip communications between token server 320 and a node of trusted environment 302. Another result of token server 320 being involved in each tokenization or detokenization operation is that token server 320 represents a single point of failure for tokenization within trusted environment 302. That is, if token server 320 becomes inoperable, tokenization within trusted environment 302 may cease.

Figure 4:
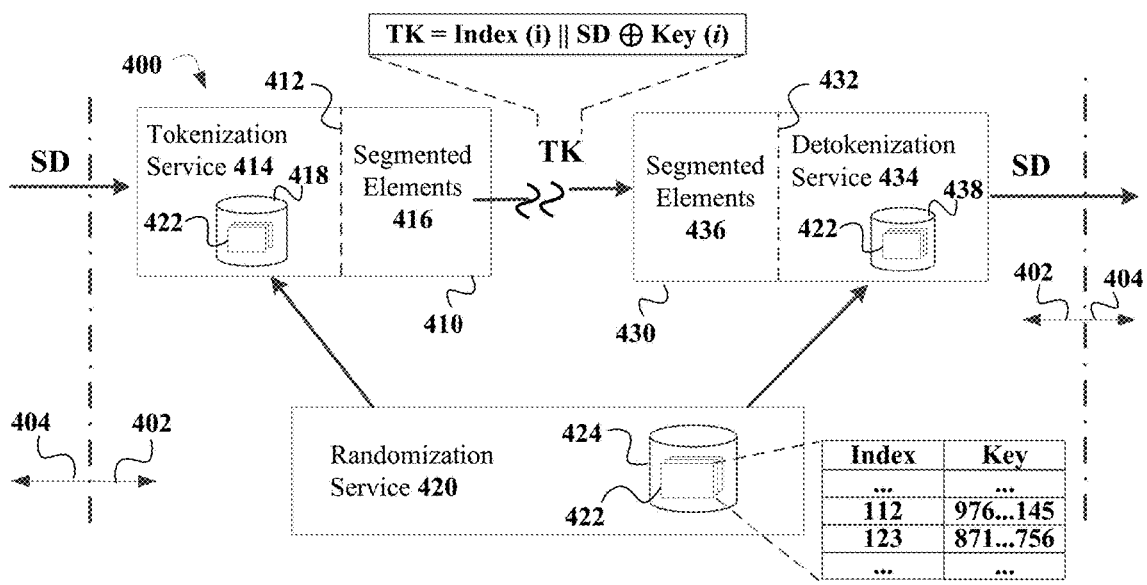
FIG. 4 is a block diagram of an example system for segmenting elements within a trusted environment using decentralized tokenization services.

FIG. 4 is a block diagram of an example system 400 for segmenting elements within a trusted environment 402 using decentralized tokenization. In FIG. 4, nodes 410 and 430 generally represent endpoints of trusted environment 402. Sensitive data is received from elements of an untrusted environment 404 via node 410 and is returned to elements of the untrusted environment 404 via node 430. To facilitate a reduction in the number of elements within trusted environment 402 that have access to sensitive data, node 410 implements partition 412 and node 430 implements partition 432.

A comparison between FIG. 3 and FIG. 4 illustrates that, unlike trusted environment 302 in which token server 320 provides centralized tokenization, trusted environment 402 implements decentralized tokenization. To that end, node 410 comprises a tokenization server 414 that intervenes between partition 412 and untrusted environment 404. Tokenization service 414 is configured to generate tokens for sensitive data received from elements of untrusted environment 404 using mapping data 422 created with set(s) of index-key pairs generated by randomization service 420, as described in greater detail below. In an embodiment, randomization service 420 is implemented using a random number generator. Tokens generated by tokenization service 414 to other elements (e.g. segmented elements 416 and/or 436) of trusted environment 402 via partition 412 for further processing.

Node 430 comprises a detokenization service 434 that intervenes between partition 432 and untrusted environment 404. Detokenization service 434 is configured to detokenize each token received from other elements (e.g., segmented elements 416 and/or 436) of trusted environment 402 via partition 432 using mapping data 422 to obtain a particular instance of sensitive data associated with that token, as described in greater detail below. Detokenization service 434 communicates each instance of sensitive data to untrusted environment 404 based on address information that detokenization service 434 receives with a corresponding token.

One aspect of decentralizing tokenization is that tokenization or detokenization operations are processed locally at endpoints of trusted environment 402 thereby avoiding any roundtrip communications between nodes of trusted environment 402 and a centralized token server. As a result, propagation delays of sensitive data-related communications between trusted environment 402 and untrusted environment 404 are less than those incurred by sensitive data-related communications involving trusted environment 302.

Another result of decentralizing tokenization is that trusted environment 402 minimizes a likelihood of single point failures. While randomization service 420 may represent a single point of failure for tokenization within trusted environment 402, that risk is minimized by preloading mapping data 422 in databases (e.g., databases 418 and/or 438) accessible to endpoints of trusted environment 402. That is, if randomization service 420 preloads mapping data 422 in those databases before tokenization or detokenization operations are processed, tokenization within trusted environment 402 may continue if randomization service 420 subsequently becomes inoperable.

Notably, trusted environment 402 implements an additional layer of isolation between segmented elements and sensitive data beyond implementing partitions 412 and 432 on nodes 410 and 430, respectively. That additional layer of isolation relates to the content of mapping data 422. In particular, mapping data 422 is devoid of any sensitive data. Rather, mapping data 422 is created using a set of index-key pairs generated by randomization service 420 with each index-key pair defining a particular index value mapped to a particular random key value. In an embodiment, randomization service 420 comprises a read privilege that prevents randomization service 420 from accessing transaction data (e.g., transaction data being processed by segmented elements of trusted environment 402). In an embodiment, randomization service 420 is configured to periodically push sets of index-key pairs to nodes 410 and 430.

A "random key value" generally refers to unpredictable values derived using an output of a randomization source, such as a random number generator. In embodiments, random key values may be implemented as: numeric values, alphabetic values, alphanumeric values, and the like. An "index value" generally refers to non-sensitive data identifying a location of a data structure comprising that index value in which a corresponding random key value resides.

Figure 5:
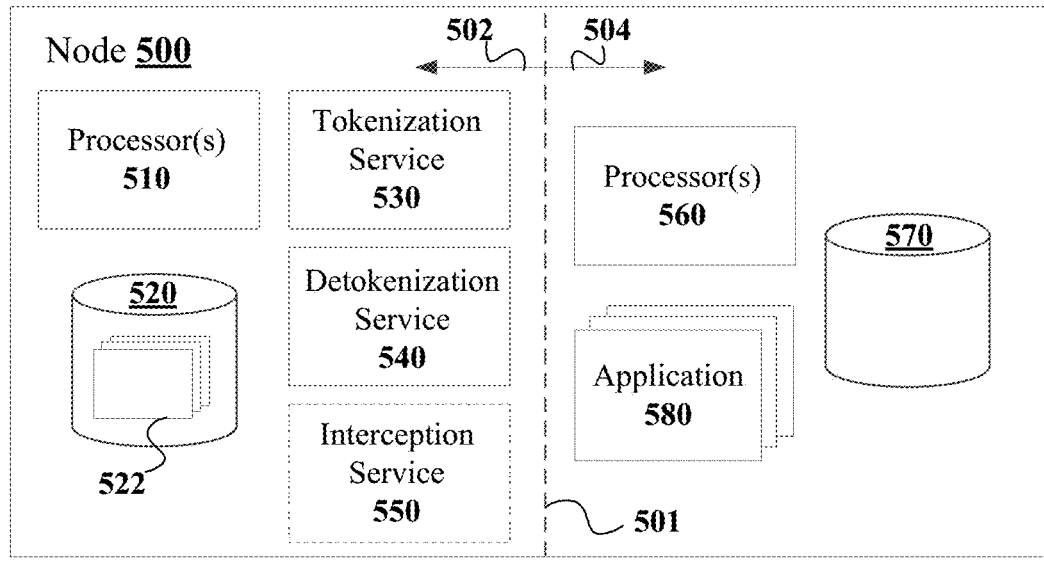
FIG. 5 is a block diagram of an example node that is suitable for implementing aspects of the invention described herein.

FIG. 5 is a block diagram of an example node 500 that is suitable for implementing aspects of the invention described herein. In an embodiment, nodes 410 and/or 430 of FIG. 4 may be implemented using node 500. Node 500 generally includes a first set of computing resources arranged as non-segmented elements 502 and a second set of computing resources arranged as segmented elements 504. The first set of computing resources include processor (or execution core) 510 and memory 520. The second set of computing resources include processor 560 and memory 570.

Node 500 is configured to implement a partition 501 to physically and/or logically isolate the first set of computing resources from the second set of computing resources. By way of example, logical isolation may be implemented using virtualization techniques. An example of physical isolation includes providing a first computing device (or server) comprising the first set of computing resources and a second computing device comprising the second set of computing resources with one or more physical barriers intervening between the first computing device and the second computing device.

Instructions stored in memory 520 upon execution by processor 510 implement a number of services, processes, or routines. Those services include: tokenization service 530, detokenization service 540, and optionally interception service 550. Tokenization service 530 is configured to generate tokens for sensitive data received from elements of an untrusted environment (e.g., client device 110 of FIG. 1) using mapping data 522 generated by a randomization service (e.g., randomization service 420 of FIG. 4) external to node 500, as discussed in greater detail below. Detokenization service 540 is configured to detokenize each token received from other elements of a trusted environment (e.g., trusted environment 402) comprising node 500 via partition 501 using mapping data 522, as described in greater detail below. Optional interception service 550 generally represents any data flow processing unit for processing data-in-transit received from elements of an untrusted environment and/or for processing data received from other elements of a trusted environment via partition 501. In an embodiment, optional interception service 550 is configured to detect sensitive data within data-in-transit received from elements of an untrusted environment and/or tokens within data received from other elements of a trusted environment via partition 501. In an embodiment, optional interception service 550 may be implemented at a transport layer of a network stack effectuated by node 500. In an embodiment, optional interception service 550 may be implemented as a packet sniffer.

Instructions stored in memory 570 upon execution by processor 560 implement a number of services, processes, or routines. Those services include an application 580 configured to consume tokens generated by a tokenization service (e.g., tokenization service 530) in effectuating transactions involving sensitive data. Continuing with the example discussed above with reference to FIG. 1 involving a client device submitting credit card information to an e-commerce platform related to a transaction, application 580 may represent a payment application of the e-commerce platform. In this example, application 580 may receive a token generated for the credit card information, as part of the transaction.

Using the token, application 580 may interact with a payment processing network (and/or an issuer system) to request authorization to proceed with the transaction. Such interaction may include application 580 transmitting an authorization request message comprising the token to the payment processing network. In an embodiment, a detokenization service (e.g., detokenization service 540) may detokenize the token in the authorization request message and replace it with the credit card information. In an embodiment, the credit card information in the authorization request message is replaced with a new token generated in accordance with a tokenization process established by the payment processing network prior to transmission.

Figure 6:
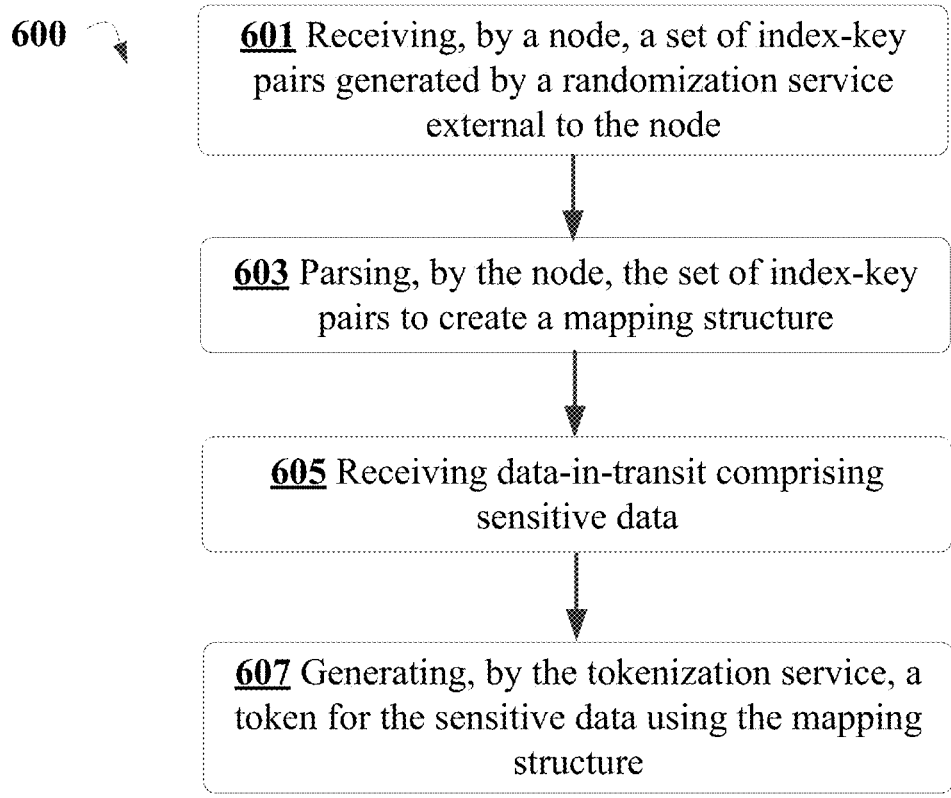
FIG. 6 is a flow-chart illustrating an example of a method of providing decentralized tokenization with mapping data devoid of sensitive data, in accordance with an embodiment of the invention.

FIG. 6 is a flow-chart illustrating an example of a method 600 of providing decentralized tokenization with mapping data devoid of sensitive data, in accordance with an embodiment of the invention. In an embodiment, method 600 is implemented by nodes 410 or 430 of FIG. 4; or node 500 of FIG. 5. At step 601, a node receives a set of index-key pairs generated by a randomization service external to the node. Each index-key pair in the set of index-key pairs defines a particular index value mapped to a particular random key value. At step 603, the node creates a mapping structure using the set of index-key pairs. By way of example and with reference to FIG. 4, mapping data 422 is created with a set of index-key pairs comprising a first index-key pair that includes index value "112" mapped to random key value "976 . . . 145" and a second index-key pair that includes index value "123" mapped to random key value "871 . . . 756". In an embodiment, the node parses the set of index-key pairs to create the mapping structure.

At step 605, data-in-transit comprising sensitive data is received. One skilled in the art will appreciate that data generally exists in three states: data-in-use, data-at-rest, and data-in-transit. Data-in-use generally refers to data that is being processed by one or more services, processes, or routines (e.g., application 580 of FIG. 5) executing or running on a processor (e.g., processor 560). Data-at-rest generally refers to data that is stored on a computer-readable storage medium (e.g., memory 520 and/or memory 570) and is not being processed by one or more services, processes, or routines executing or running on a processor. Examples of data-at-rest include data residing or stored on: a hard drive, network attached storage, a cloud-based storage device, and the like. Data-in-transit generally refers to data that is being propagated or transferred over a communication medium. Examples of data-in-transit include data being propagated over: a wired or wireless communication path from a first computing device to a second computing device, a service bus during an input/output operation, and the like. In an embodiment, receiving the data-in-transit comprises a data flow processing unit of the node for processing the data-in-transit, detecting the sensitive data within the data-in-transit. In an embodiment, the data flow processing unit of the node is implemented as an interception service. In an embodiment, the node comprises memory resources storing data-at-rest and the sensitive data is absent from the data-at-rest.

At step 607, a tokenization service of the node generates a token for the sensitive data using the mapping structure. In an embodiment, the mapping structure comprises a plurality of index values. In an embodiment, generating the token comprises randomly selecting an index value from among the plurality of index values. In an embodiment, generating the token further comprises performing an invertible operation on the sensitive data and a random key value mapped to the index value in the mapping structure to generate the token. In an embodiment, generating the token further comprises concatenating or appending the randomly selected index value to an output of the invertible operation.

Continuing with the example discussed above with reference to FIG. 4, the tokenization service may randomly select index value "123" from mapping data 422. In that instance, the tokenization service may then perform an invertible operation on the sensitive data and random key value "871 ... 756". Index value "123" may be concatenated to an output of the invertible operation to generate the token.

In general, an invertible operation is defined using: let $\mathfrak{T}$ be a set and let f:$\mathfrak{T} \times \mathfrak{T} \to \mathfrak{T}$ be a function, then:

$$\forall a,b,c \in \mathfrak{T} \ |f(a,b)=c, \exists g,h: \mathfrak{T} \times \mathfrak{T} \to \mathfrak{T} \ |g(a,c)=b, h(b,c)=a$$

In an embodiment, an invertible operation is defined using: let $\mathfrak{T} = \{0,1\}^\ell$ for some $\ell \in \mathbb{N}$ be the set of all binary strings of a given length and let f:$\mathfrak{T} \times \mathfrak{T} \to \mathfrak{T}$ be a function, then:

$$\forall a,b,c \in \mathfrak{T}^3 \ |f(a,b)=c, \exists g,h \mathfrak{T} \times \mathfrak{T} \to \mathfrak{T} \ |g(a,c)=b, h(b,c)=a$$

And then, one can define a triplet (f, g, h) of operations f, g and h such that: f(a,b)=c; g(a,c)=b; h(b,c)=a; $\forall$a, b, c$\in \mathfrak{T}$; where f, g and h are invertible operations. One aspect this definition of a triplet is that if one operation among operations f, g or h is a XOR operation, then the two remaining operations should be XOR operations. In an embodiment, the invertible operation is a bitwise XOR operation.

In an embodiment, invertible operations can be used in three conditions: (i) to compute a token from sensitive data and a particular random key value mapped to a given index value in a mapping structure with a function named "f" for exemplary purposes only; (ii) to compute a particular random key value mapped to a given index value in a mapping structure from a token and sensitive data with a function named "g" for exemplary purposes only; and (iii) to compute sensitive data from a token and a particular random key value mapped to a given index value in a mapping structure with a function named "h" for exemplary purposes only. According to an embodiment, these functions f, g, h used in these three condition should be invertible and respect: f(a,b)=c; g(a,c)=b; h(b,c)=a; $\forall$a, b, c$\in \mathfrak{T}$. Accordingly, these three functions f, g and h should form one triplet, as defined above.

In one embodiment, an XOR function can be used for one of the function f, g or h so that accordingly f=g=h=XOR constitute a valid triplet as defined above. In an embodiment, if a digit-wise addition modulo 10 operation is used for f, then for g and h the digit-wise subtraction modulo 10 operation should be used, so that the three functions f, g, h also constitute a valid triplet, as defined above. In an embodiment, if a digit-wise addition modulo 10 operation is used for g, then for f and h the digit-wise subtraction modulo 10 operation should be used, so that the three functions f, g, h also constitute a valid triplet, as defined above. In an embodiment, if a digit-wise addition modulo 10 operation is used for h, then for f and g the digit-wise subtraction modulo 10 operation should be used, so that the three functions f, g, h also constitute a valid triplet, as defined above.

In an embodiment, generating the token further comprises querying a blacklist structure of the node associated with the mapping structure to identify a status of the index value. In an embodiment, method 600 further comprises synchronizing a blacklist structure of the node with a copy of the blacklist structure residing in memory resources of another node external to the node. In an embodiment, synchronization of the blacklist structure is performed in a low priority and/or non-blocking fashion mode. In this embodiment, a single index value (and associated random key value) may potentially be used in generating multiple tokens before synchronization occurs. In that instance each token would be considered valid and function properly. One potential risk of using a single index value and associated random key value to generate multiple tokens is that sensitive data associated with each token may become compromised by an unintended recipient with knowledge of token structure and access to each token.

In an embodiment, method 600 further comprises forwarding the token to an application interface of a process executing using a first set of computing resources that are isolated from a second set of computing resources that the node allocates to the tokenization process. In an embodiment, the application interface is an application programming interface ("API"), a library, a remote API, a Web API, or a combination thereof. In an embodiment, the first set of computing resources are allocated to the process by the node. In an embodiment, the first set of computing resources are allocated to the process by another node of a system comprising the node that is external to the node. In an embodiment, the process is implemented using segmented application 580 of FIG. 5. In an embodiment, the tokenization service and the process are implemented using tokenization service 420 and segmented elements 436 of FIG. 4, respectively.

In an embodiment, the token is forwarded to the API without storing data mapping the sensitive data to the token. In an embodiment, method 600 further comprises encrypting the token prior to forwarding the token to the API of the process. In an embodiment, the token is forwarded to the API of the process as an encrypted token and method 600 further comprises encrypting the token to obtain the encrypted token. In an embodiment, the node includes segmented resources comprising the tokenization service and an HSM (e.g., HSM 140 of FIG. 1) and encrypting the token comprises the tokenization service interacting with the HSM.

In an embodiment, method 600 further comprises configuring a detokenization service to detokenize tokens using a plurality of mapping structures associated with a plurality of epochs, as discussed below in greater detail with respect to FIG. 9. In an embodiment, the detokenization service selects a particular mapping structure from the plurality of mapping structures for detokenizing a given token using a version identifier extracted from the given token. In an embodiment, the detokenization service is effectuated by computing resources of the node. In an embodiment, the detokenization service is effectuated using computing resources of another node within a system comprising the node that is external to the node.

In an embodiment, the token is a first token and method 600 further comprises receiving a second token generated by a remote tokenization service using the mapping structure. In an embodiment, the remote tokenization service executes on computing resources external to the node. In an embodiment, method 600 further comprises decrypting the second token to obtain a decrypted second token. In an embodiment, method 600 further comprises extracting a version identifier associated with the mapping structure from the decrypted second token. In an embodiment, method 600 further comprises detokenizing the decrypted second token using an index value extracted from the decrypted second token and a random key value mapped to the index value in the mapping structure.

In an embodiment, method 600 is performed by processing logic, including hardware, firmware, software, or a combination thereof. In an embodiment, method 600 is performed by a processor executing code stored in a non-transitory computer-readable medium (e.g., a memory).

Figure 7:
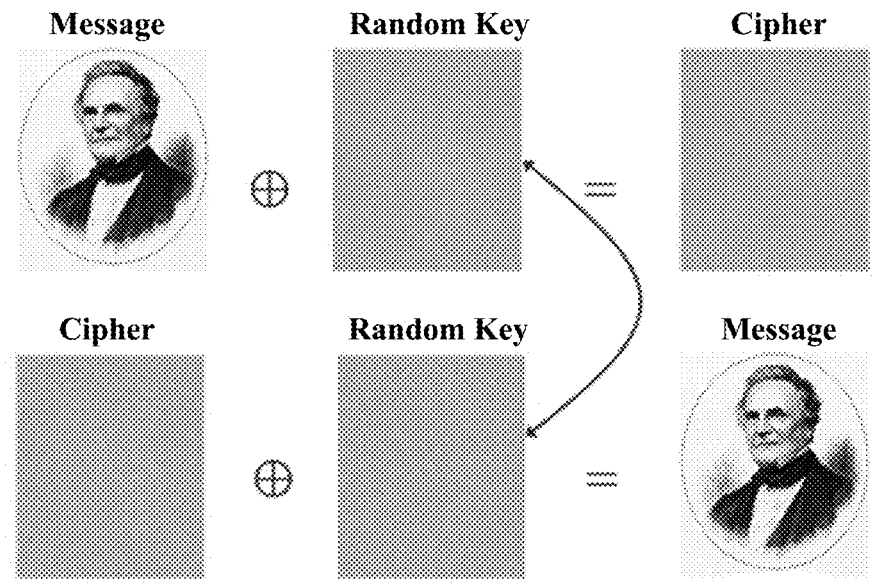
FIG. 7 illustrates a conceptual, high-level overview of deterministic encryption.

FIG. 7 illustrates a high-level overview of an example deterministic encryption scheme. In FIG. 7, a plaintext message and a random key are provided to an encryption algorithm to produce ciphertext. An intended recipient may recover the plaintext message by providing the random key and the ciphertext to a decryption algorithm. The ciphertext lacks any value to an unintended recipient as long as the random key used to produce the ciphertext remains secure. However, if the random key becomes compromised, each instance of ciphertext subsequently produced with the random key becomes compromised. Specifically, an unintended recipient may provide the compromised random key and a given instance of ciphertext to a decryption algorithm to recover a corresponding plaintext message.

Figure 8:
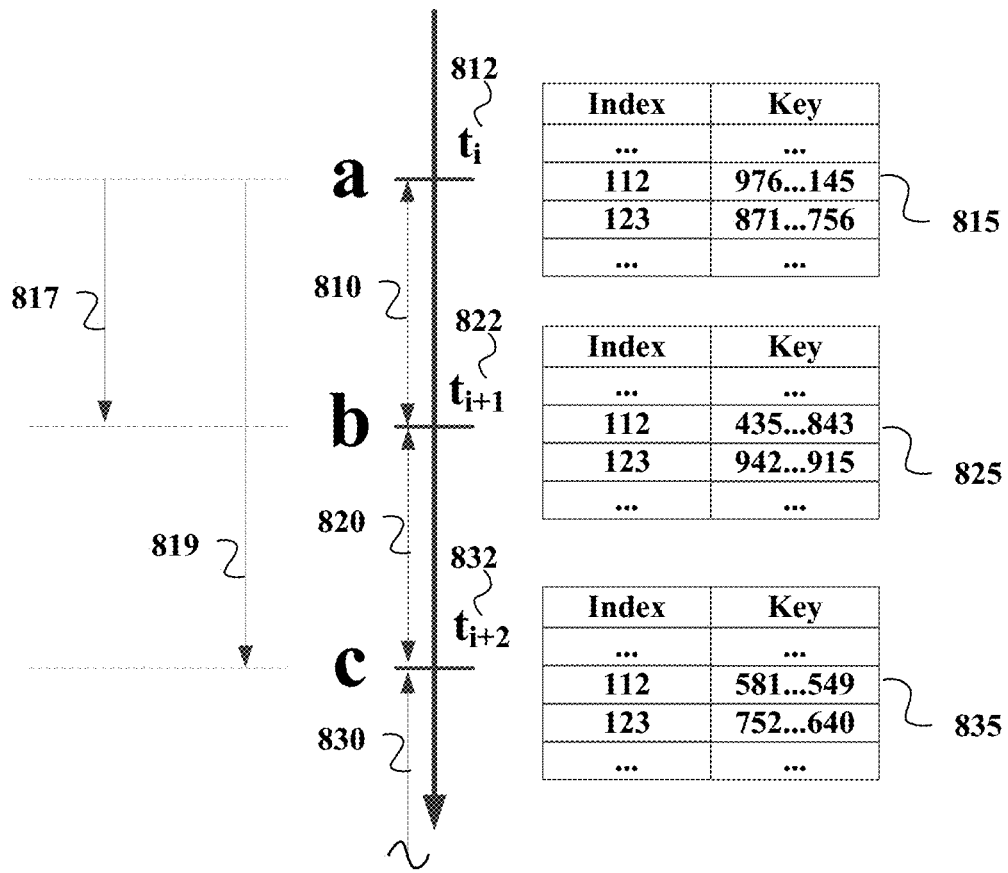
FIG. 8 depicts a timeline showing periodic refreshing of mapping structures, in accordance with an embodiment of the present invention.

Additional security for sensitive data may be achieved by implementing a security measure that periodically refreshes mapping structures used to generate tokens, as illustrated by FIG. 8. Periodically refreshing of mapping structures reduces a risk of the tokens being compromised from sets of index-key pairs comprising such mapping becoming compromised. In FIG. 8, a plurality of pre-defined times is represented along a timeline by designators 812, 822, and 832. Those plurality of pre-defined times partition the timeline into a plurality of time periods (or epochs) represented by designators 810, 820, and 830.

Each epoch among the plurality of epochs has a duration defined by its associated start time and a start time of an epoch immediately following that epoch. For example, first epoch 810 has a duration defined by start time 812 and start time 822 of second epoch 820. As another example, second epoch 820 has a duration defined by start time 822 and start time 832 of third epoch 830. In an embodiment, first epoch 810, second epoch 820, and third epoch 830 have equivalent durations. In an embodiment, the duration of first epoch 810 is different from the respective durations of second epoch 820 and third epoch 830.

Over a duration of a given epoch, that epoch is identified as a "current epoch". When the duration of the given epoch concludes at the start time of the epoch immediately following the given epoch, a new epoch (i.e., the epoch immediately following the given epoch) is identified as the current epoch. For example, a first trigger may be issued when a background process of a node (e.g., nodes 410, 430, or 500) determines that a current system time corresponds to start time 812 of first epoch 810. At start time 812, first epoch 810 is identified as a current epoch. In response to the first trigger, the node configures a tokenization service (e.g., tokenization service 414 of FIG. 4 and/or tokenization service 530 of FIG. 5) to tokenize sensitive data using first mapping structure 815. As noted above, the use of system time sources to periodically refresh mapping structures facilitates the ephemeral nature of each set of index-key pairs comprising such mapping structures. To that end, each set of index-key pairs comprising first mapping structure 815 has a usable life defined by first epoch 810. In one respect, first epoch 810 defines that usable life through the node configuring the tokenization service to tokenize sensitive data using first mapping structure 815 for a duration 817 of first epoch 810.

A second trigger may be issued when the background process determines that the current system time corresponds to start time 822 of second epoch 820 and second epoch 820 is identified as the current epoch. In response to the second trigger, the node configures the tokenization service to tokenize sensitive data for a duration of second epoch 820 using second mapping structure 825. Upon configuring the tokenization service to tokenize sensitive data using second mapping structure 825, the tokenization service no longer tokenizes sensitive data using first mapping structure 815. However, first mapping structure 815 remains usable by other services during second epoch 820. For example, a detokenization service of the node (or another node of a system comprising the node) may be configured to detokenize using first mapping structure 815 for duration 819.

As illustrated by FIG. 8, each mapping structure includes a different set of index-key pairs. For example, first mapping structure 815, index value "112" is mapped to random key value "976 . . . 154". However, in second mapping structure 825, index value "112" is mapped to random key value "435 . . . 843". This illustrates another aspect of the present disclosure in which mapping structures are versioned. In the example of FIG. 8, that versioning of mapping structures is represented by the lowercase letters associated with each epoch start time. For example, first epoch 810 is associated with version "a", second epoch 820 is associated with version "b", and third epoch 830 is associated with version "c". In an embodiment, each token generated by a mapping structure comprising index-key pairs includes a version identifier indicative of a version associated with an epoch in which that token was generated.

One skilled in the art may recognize that version identifiers can take other forms and be incorporated into ephemeral tokens in other ways. For example, version identifiers may be implemented as one or more values comprising: numeric values, alphabetic values, alphanumeric values, and the like. As another example, version identifiers may be incorporated into tokens by appending version identifiers as a suffix to each token or by inserting version identifiers within a sequence of values forming each token. As another example, version identifiers may be incorporated into tokens by appending version identifiers as a prefix to each token.

In an embodiment, a form of version identifier used in one epoch may be different from a form of version identifier used in another epoch. In an embodiment, version identifiers may be incorporated into tokens in a first manner for one epoch whereas version identifiers may be incorporated into tokens in a second manner that is different from the first manner for another epoch. In this embodiment, it remains possible to identify a respective version identifier of each token received regardless of which manner that version identifier was incorporated into that token.

Such mapping structure versioning represents a means through which an epoch defines a usable life of each set of index-key pairs comprising a given mapping structure. For example, a third trigger may be issued when the background process determines that the current system time corresponds to start time 832 of third epoch 830 and third epoch 830 is identified as the current epoch. In response to the third trigger, the node configures the tokenization service to tokenize sensitive data for a duration of third epoch 830 using third mapping structure 835.

Upon configuring the tokenization service to tokenize sensitive data using third mapping structure 835, the tokenization service no longer tokenizes sensitive data using second mapping structure 825. However, a detokenization service (e.g., detokenization service 434 of FIG. 4 and/or detokenization service 540 of FIG. 5) may be configured to detokenize tokens using second mapping structure 825 for the duration of third epoch 830. As illustrated in FIG. 8, the detokenization service may also be configured to detokenize tokens using third mapping structure 835 for the duration of third epoch 830. One aspect of the detokenization service detokenizing tokens using second mapping structure 825 and/or third mapping structure 835 for the duration of third epoch 830 is that tokens generated during the second epoch 820 and/or third epoch 830 may be received by the detokenization service during third epoch 830. In an embodiment, the detokenization service is configured to identify a particular epoch in which a given token is generated using a version identifier of the given token. In an embodiment, the given token is encrypted, and the detokenization service is configured to interact with an HSM (e.g., HSM 140 of FIG. 1) to decrypt the given token to obtain a decrypted token.

Another aspect of the present disclosure illustrated by FIG. 8 is that mapping structure versions may be cyclically reused over time. For example, prior to start time 832, the detokenization service may be configured to process detokenization requests using first mapping structure 815. Subsequent to start time 832, the detokenization process may be configured to no longer process detokenize tokens using first mapping structure 815. Yet, at a later time, a new mapping structure associated with version "a" may be created using a new set of index-key pairs generated by the randomization service for use during a later epoch.

FIGS. 9 and 10 illustrate an example of cyclically reusing mapping structure versions over time. Referring to FIG. 9, an epoch identified as a current epoch at a first time is associated with version "w". In FIG. 9, a tokenization service is configured to tokenize sensitive data included in received data-in-transit using a mapping structure associated with version "w", as represented by designator 910. At the first time, a detokenization process is configured to detokenize tokens using mapping structures associated with versions "t"–"w", as represented by designator 920.

Referring to FIG. 10, a new epoch is identified as the current epoch at a second time subsequent to the first time. That new epoch is associated with version "x". In FIG. 10, the tokenization service is configured to tokenize sensitive data using a mapping structure associated with version "x", as represented by designator 1010. At the second time, the detokenization process is configured to detokenize tokens using mapping structures associated with versions "u"–"x", as represented by designator 1020. As illustrated by FIG. 10, neither the tokenization service nor the detokenization service is configured to process sensitive data or tokens using a mapping structure associated with version "t". This illustrates that mapping structure version "t" has been released at the second time for use at a later time.

FIG. 11 illustrates an example of sensitive data 1100 and an associated token 1150 having an equivalent number of bytes while having a dissimilar number of bits. In the example of FIG. 11, sensitive data 1100 is encoded as a string of 16 numerical digits (or bytes) that has been formatted into a first chunk 1102, a second chunk 1104, and a third chunk 1106. Upon tokenization using a mapping structure (e.g., mapping data 422 and/or 522) comprising a set of index-key values, sensitive data 1100 is transformed into associated token 1150. As seen in FIG. 11, sensitive data 1100 and token 1150 each comprise 16 bytes. However, while second chunk 1104 of sensitive data 1100 is encoded using numerical values, second chunk 1154 of token 1150 is encoded using case-sensitive alphanumeric values. One skilled in the art may recognize that the 6 numerical digits of second chunk 1104 represents $10^6$ possible permutations, which may be represented using approximately 24 bits, and the 6 case-sensitive alphanumerical digits of second chunk 1154 represents $62^6$ possible permutations, which may be represented using approximately 34 bits. As such, through encoding second chunk 1154 as case-sensitive alphanumeric digits instead of as numerical digits, second chunk 1154 comprises 10 more bits than second chunk 1104 for encoding information.

Having described various embodiments of the invention, an exemplary computing environment suitable for implementing embodiments of the invention is now described. With reference to FIG. 12, client device 110; computing device 120; token server 130 and 320; HSM 140; internal system 160; and nodes 310, 330, 410, 430, and 500 may be implemented on one or more computer devices or systems, such as exemplary computer system 1200. The computer system 1200 may include a processor 1226, a memory 1228, a mass storage memory device 1230, an input/output (I/O) interface 1232, and a Human Machine Interface (HMI) 1234. The computer system 1200 may also be operatively coupled to one or more external resources 1236 via the network 1223 or I/O interface 1232. External resources may include, but are not limited to, servers, databases, mass storage devices, peripheral devices, cloud-based network services, or any other suitable computer resource that may be used by the computer system 1200.

The processor 1226 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1228. The memory 1228 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1230 may include data storage devices such as a hard drive, optical drive, tape drive, non-volatile solid state device, or any other device capable of storing information.

The processor 1226 may operate under the control of an operating system 1238 that resides in the memory 1228. The operating system 1238 may manage computer resources so that computer program code embodied as one or more computer software applications, such as an application 1240 residing in memory 1228, may have instructions executed by the processor 1226. In an alternative embodiment, the processor 1226 may execute the application 1240 directly, in which case the operating system 1238 may be omitted. One or more data structures 1242 may also reside in memory 1228, and may be used by the processor 1226, operating system 1238, or application 1240 to store or manipulate data.

The I/O interface 1232 may provide a machine interface that operatively couples the processor 1226 to other devices and systems, such as the network 1223 or the one or more external resources 1236. The application 1240 may thereby work cooperatively with the network 1223 or the external resources 1236 by communicating via the I/O interface 1232 to provide the various features, functions, applications, processes, or modules comprising embodiments of the invention. The application 1240 may also have program code that is executed by the one or more external resources 1236, or otherwise rely on functions or signals provided by other system or network components external to the computer system 1200. Indeed, given the nearly endless hardware and software configurations possible, persons having ordinary skill in the art will understand that embodiments of the invention may include applications that are located externally to the computer system 1200, distributed among multiple computers or other external resources 1236, or provided by computing resources (hardware and software) that are provided as a service over the network 1223, such as a cloud computing service.

The HMI 1234 may be operatively coupled to the processor 1226 of computer system 1200 in a known manner to allow a user to interact directly with the computer system 1200. The HMI 1234 may include video or alphanumeric displays, a touch screen, a speaker, and any other suitable audio and visual indicators capable of providing data to the user. The HMI 1234 may also include input devices and controls such as an alphanumeric keyboard, a pointing device, keypads, pushbuttons, control knobs, microphones, etc., capable of accepting commands or input from the user and transmitting the entered input to the processor 1226.

A database 1244 may reside on the mass storage memory device 1230, and may be used to collect and organize data used by the various systems and modules described herein. The database 1244 may include data and supporting data structures that store and organize the data. In particular, the database 1244 may be arranged with any database organization or structure including, but not limited to, a relational database, a hierarchical database, a network database, or combinations thereof. In an embodiment, database 1244 may be used to implement one or more of: database 150, database 324, database 418, database 424, database 438, a database in memory 520, and a database in memory 570. A database management system in the form of a computer software application executing as instructions on the processor 1226 may be used to access the information or data stored in records of the database 1244 in response to a query, where a query may be dynamically determined and executed by the operating system 1238, other applications 1240, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
a node comprising a processor, a computer-readable storage medium, and a tokenization service, the computer-readable storage medium comprising instructions that upon execution by the processor cause the processor to perform operations, the operations comprising:
receiving, by the node, a set of index-key pairs generated by a randomization service external to the node, wherein each index-key pair defines a particular index value mapped to a particular random key value;
creating, by the node, a mapping structure using the set of index-key pairs, wherein the mapping structure includes a plurality of index values;
receiving data-in-transit comprising sensitive data;
generating, by the tokenization service, a token for the sensitive data using the mapping structure;
encrypting the token to obtain an encrypted token; and
forwarding the encrypted token to an application interface of a process executing using a first set of computing resources that are isolated from a second set of computing resources that the node allocates to the tokenization service, and
wherein generating the token comprises:
randomly selecting an index value from among the plurality of index values; and
performing an invertible operation on the sensitive data and a random key value mapped to the index value in the mapping structure to generate the token.

2. The system of claim 1, wherein the node is a first node, wherein the system further comprises the randomization service and a second node, and wherein the randomization service is configured to periodically push updated sets of index-key pairs to the first node and the second node.

3. The system of claim 1, wherein the node is a first node, wherein the system further comprises a second node, and wherein the first set of computing resources are allocated to the process by the second node.

4. The system of claim 1, wherein the first set of computing resources are allocated to the process by the node.

5. The system of claim 1, wherein the token is forwarded to the application interface without storing data mapping the sensitive data to the token.

6. The system of claim 1, wherein the instructions, when executed, further cause the system to perform additional operations, the additional operations comprising:
encrypting the token prior to forwarding the token to the application interface of the process.

7. The system of claim 1, wherein the token and the sensitive data are each composed of an equivalent number of bytes, and wherein the token comprises a first number of bits and the sensitive data comprises a second number of bits that is different from the first number of bits.

8. The system of claim 1, wherein the randomization service is blocked from accessing transaction data.

9. The system of claim 1, wherein receiving the data-in-transit comprises:
detecting, by a data flow processing unit of the node processing the data-in-transit, the sensitive data within the data-in-transit.

10. A method comprising:
receiving, by a node, a set of index-key pairs generated by a randomization service external to the node, wherein each index-key pair defines a particular index value mapped to a particular random key value;
creating, by the node, a mapping structure using the set of index-key pairs;
receiving data-in-transit comprising sensitive data;
generating, by a tokenization service of the node, a token for the sensitive data using the mapping structure, wherein the mapping structure includes a plurality of index values;
encrypting the token to obtain an encrypted token; and
forwarding the encrypted token to an application interface of a process executing using a first set of computing resources that are isolated from a second set of computing resources that the node allocates to the tokenization service, and
wherein generating the token comprises:
randomly selecting an index value from among the plurality of index values; and
performing an invertible operation on the sensitive data and a random key value mapped to the index value in the mapping structure to generate the token.

11. The method of claim 10, further comprising:
synchronizing the blacklist structure of the node with a copy of the blacklist structure residing in memory resources of another node external to the node.

12. The method of claim 10, further comprising:
configuring a detokenization service to detokenize tokens using a plurality of mapping structures associated with a plurality of epochs, wherein the mapping structure is one of the plurality of mapping structures residing in memory resources accessible to the detokenization service, and wherein at least one epoch among the plurality of epochs precedes a corresponding epoch of the mapping structure.

13. The method of claim 12, wherein a given mapping structure of the plurality of mapping structures associated with the at least one epoch is only used for detokenization operations not for tokenization operations.

14. The method of claim 12, wherein the detokenization service selects a particular mapping structure from the plurality of mapping structures for detokenizing a given token using a version identifier extracted from the given token.

15. The method of claim 10, further comprising:
detokenizing, by a detokenization service, the token using the mapping structure and an index value extracted from the token.

16. The method of claim 10, wherein the token is a first token, the method further comprising:
receiving a second token generated by a remote tokenization service using the mapping structure, the remote tokenization service executing on computing resources external to the node;
decrypting the second token to obtain a decrypted second token;
extracting a version identifier associated with the mapping structure from the decrypted second token; and detokenizing the decrypted second token using an index value extracted from the decrypted second token and a random value mapped to the index value in the mapping structure.

17. The method of claim 10, wherein the node comprises memory resources storing data-at-rest, and wherein the sensitive data is absent from the data-at-rest.

18. A non-transitory computer-readable storage medium comprising computer-readable instructions that upon execution by a processor of a computing device cause the computing device to:
 receive, by a node, a set of index-key pairs generated by a randomization service external to the node, wherein each index-key pair defines a particular index value mapped to a particular random key value;
 create, by the node, a mapping structure using the set of index-key pairs, wherein the mapping structure includes a plurality of index values;
 receive data-in-transit comprising sensitive data;
 generate, by a tokenization service of the node, a token for the sensitive data using the mapping structures;
 encrypt the token to obtain an encrypted token; and
 forward the encrypted token to an application interface of a process executing using a first set of computing resources that are isolated from a second set of computing resources that the node allocates to the tokenization service, and
 wherein generate the token comprises:
  randomly select an index value from among the plurality of index values; and
  perform an invertible operation on the sensitive data and a random key value mapped to the index value in the mapping structure to generate the token.

* * * * *